(12) United States Patent
Bund et al.

(10) Patent No.: US 7,140,926 B2
(45) Date of Patent: Nov. 28, 2006

(54) TELECOMMUNICATIONS TERMINAL MODULE

(75) Inventors: Christine B. Bund, Wuppertal (DE); Friedrich Wilhelm Denter, Castrop-Rauxel (DE); Hans-Dieter Otto, Wipperfurth (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/504,935

(22) PCT Filed: Mar. 4, 2003

(86) PCT No.: PCT/US03/06595

§ 371 (c)(1),
(2), (4) Date: Apr. 6, 2005

(87) PCT Pub. No.: WO03/079643

PCT Pub. Date: Sep. 25, 2003

(65) Prior Publication Data

US 2005/0191908 A1 Sep. 1, 2005

(30) Foreign Application Priority Data

Mar. 11, 2002 (DE) .......................... 202 03 910 U

(51) Int. Cl.
*H01R 9/22* (2006.01)

(52) U.S. Cl. ...................................... 439/709; 439/660

(58) Field of Classification Search ................ 439/709, 439/660
See application file for complete search history.

(56) References Cited

U.S. PATENT DOCUMENTS 2,863,970 A   12/1958  Miller
3,751,618 A   8/1973   Hallerberg
4,286,121 A   8/1981   Olszewski et al.
(Continued)

FOREIGN PATENT DOCUMENTS

DE   201 04 605 U1   7/2001
(Continued)

OTHER PUBLICATIONS

Specifications and Performance Criteria, ADSL Splitter Block S 5000, Copyright © 2000, RXS Kabelgarnituren GmbH & Co. KG, D-58093 Hagen, Germany, 4 pages.

*Primary Examiner*—Briggitte R. Hammond
(74) *Attorney, Agent, or Firm*—John A. Burtis

(57) ABSTRACT

A telecommunications terminal module (10) is provided, having a splitter group or other electrical or electronic component (26) integrated in the terminal module (10), and two rows of contacts (18, 18') with contacts (14, 14',) to which cable cores (16) can be connected from the outside of the terminal module (10), the contacts (14) being connected with contacts (32) of the splitter group (26) inside the terminal module (10), and the contacts (14) being designed in such a way that they approach each other inside the terminal module (10), at least in parts, but are electrically separated from one another and are separately connected to the splitter group (26).

13 Claims, 3 Drawing Sheets

U.S. PATENT DOCUMENTS

| | | | |
|---|---|---|---|
| 4,822,306 A * | 4/1989 | Klaiber | 439/709 |
| 5,451,170 A * | 9/1995 | Suffi | 439/709 |
| 5,581,134 A * | 12/1996 | Romerein et al. | 439/188 |
| 6,005,497 A | 12/1999 | Snyder | |
| 2004/0022013 A1 | 2/2004 | Badura et al. | |
| 2004/0242081 A1* | 12/2004 | Otto et al. | |

FOREIGN PATENT DOCUMENTS

| | | |
|---|---|---|
| DE | 100 29 870 A1 | 1/2002 |
| DE | 202 00 746 U1 | 5/2002 |
| EP | 0338 598 A2 | 10/1989 |
| EP | 0493 740 A1 | 7/1992 |
| EP | 0766 482 A2 | 4/1997 |
| EP | 0 909 102 A2 | 4/1999 |
| EP | 1 093 308 A2 | 4/2001 |
| WO | WO 98/31157 A1 | 7/1998 |
| WO | WO 00/76178 A1 | 12/2000 |
| WO | 0243 296 A1 | 3/2001 |
| WO | WO 01/15282 A1 | 3/2001 |
| WO | WO 01/15283 A1 | 3/2001 |
| WO | WO 01/97339 A1 | 12/2001 |
| WO | WO 02/076109 A2 | 9/2002 |
| WO | WO 03/061303 A2 | 7/2003 |

\* cited by examiner

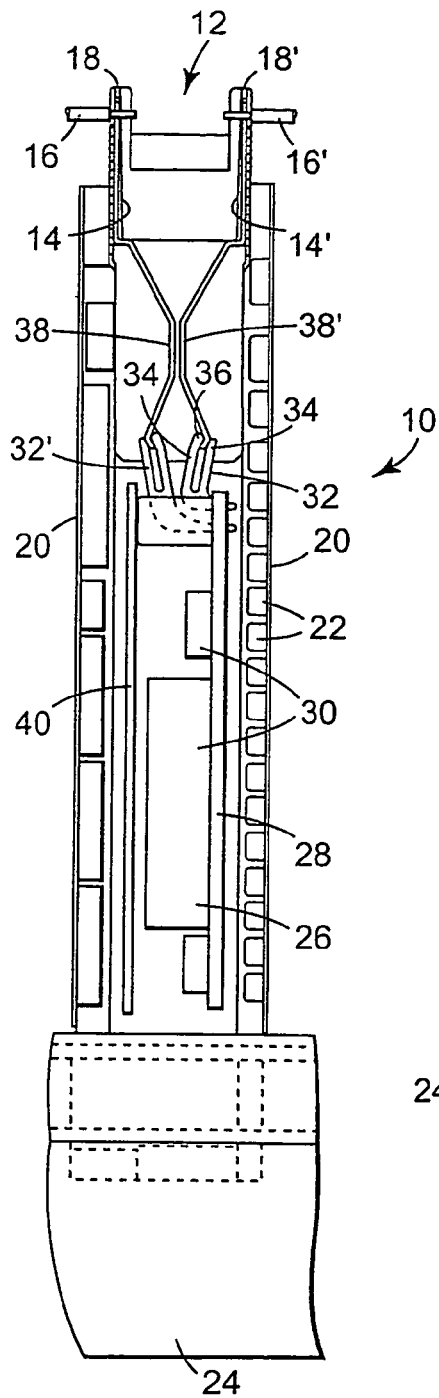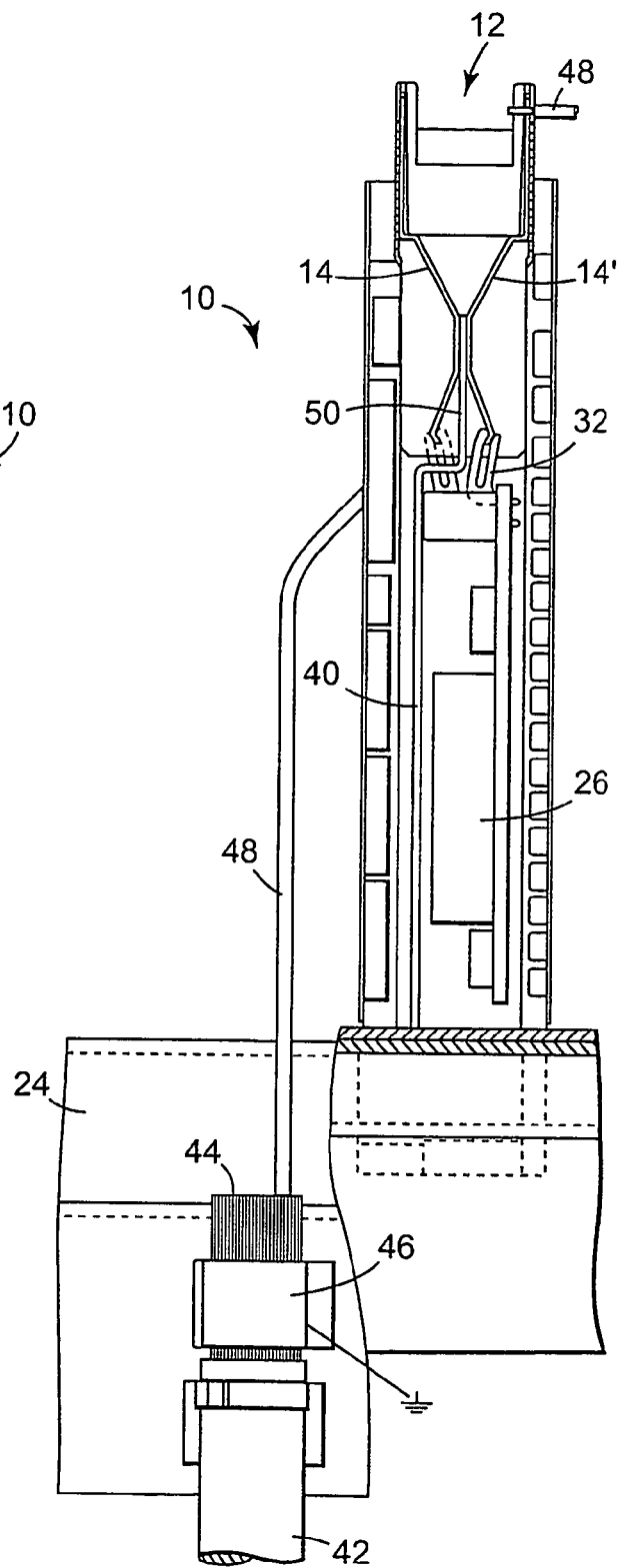
Fig. 1
Fig. 2

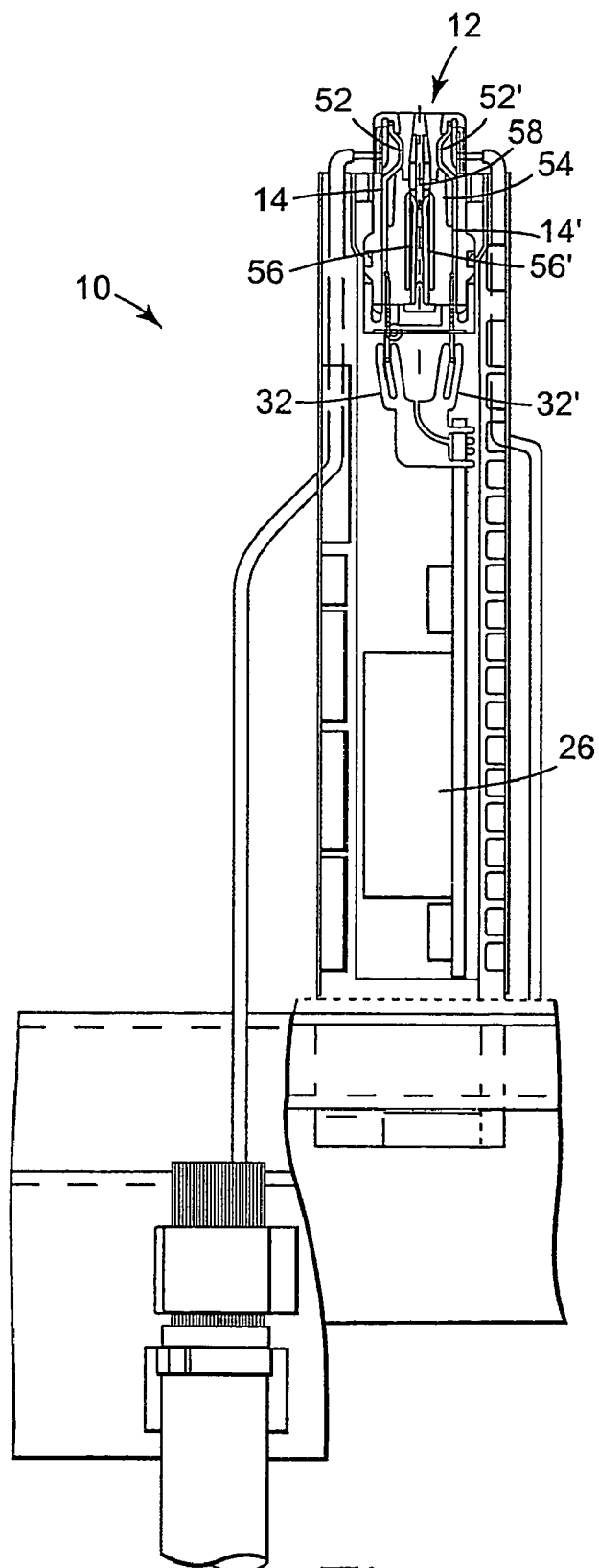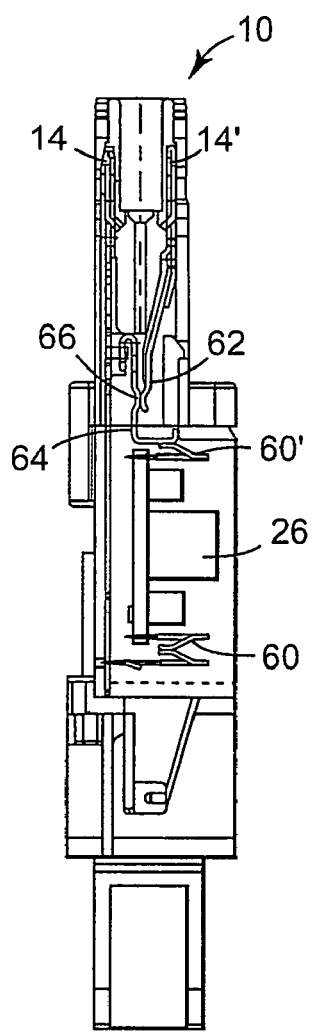
Fig. 3
Fig. 4

TELECOMMUNICATIONS TERMINAL MODULE

FIELD OF THE INVENTION

The invention relates to a telecommunications terminal module.

BACKGROUND OF THE INVENTION

In the telecommunications field, it is necessary for cable cores serving signal communication to be connected with other cable cores in various devices. For example, subscriber lines are connected with system lines in a main distributor, which lead to an exchange. The connection generally results via suitable terminal modules having at least two rows of contacts to which the cable cores can be connected.

In connection with the transmission of several different signals via the same line, the use of so-called splitters is necessary in order to "split up" different signals, transmitted via the same line in separate frequency bands, into individual signals. The individual line leading to the subscriber, which transfers multiple signals, is connected, for example, on one side of a corresponding splitter group. Attached on the other side, on which the individual signals are separated, is a system line which transmits the normal telephone ("POTS") signal and leads to the exchange as well as a line which transfers the additional signal, e.g. a high-bit-rate data signal, and leads to further devices, e.g. a DSLAM.

German patent DE-U-201 04 605 relates to a telecommunications terminal block in which a splitter group is integrated. The terminal block thus consists of two isolating modules placed one on top of the other, with only two of the rows of contacts of the respective isolating contacts being used for connecting cable cores. Both of the inner rows of contacts are covered and are not used for connecting cable cores. There are contacts inside the module, which are provided on the splitter groups and are linked with the contacts, to which cable cores can be connected, in a manner not described in more detail.

Furthermore, there is a terminal block having a splitter group made by the firm Corning Cable Systems under the designation "ADSL-Splitterblock S5000", each splitter group being arranged between two terminal modules such that a layered arrangement results overall. The respective terminal modules have two rows of contacts and are connected with the splitter group at the rear side of the respective terminal module via a suitable "backplane".

SUMMARY OF THE INVENTION

The invention is aimed at providing a terminal module which can be easily constructed.

The telecommunications terminal module has a splitter group integrated in the module and two rows of contacts to which cable cores can be connected from outside of said module. The contacts are connected inside the module to the contacts of the splitter groups. Finally, the contacts are designed in such a way that they approach each other at least in sections inside the module, but are, however, separated from one another electrically and are connected separately to the splitter groups.

The terminal module is advantageous to the effect that the splitter group can be integrated in the module, but can, however, additionally be removed from said terminal module with little effort as specified in more detail below. The integration of the splitter group in the terminal module simplifies the handling of said terminal module and leads to an advantageous reduction in the individual parts required.

The use of only two rows of contacts, to which cable cores can be connected, further simplifies the construction of the terminal module. It must be noted here that it is not necessary for both rows of contacts to be provided on a front side of the terminal module. Rather one of the two rows of contacts can be provided on the front side and the other can be provided on the rear side or even on the upper or lower side. In specific embodiments, even both rows of contacts can be configured on the upper, lower or rear side. With regard to an embodiment, in which at least one of the two rows of contacts is arranged on the rear side, it must be noted that provision could be made for said contacts to be adapted for connection with a so-called cable plug. In other words, such contacts should not be formed as insulation displacement contacts. Rather those cable cores which are supposed to be connected at the rear side concerned can be included in a cable plug. This cable plug can thus have contacts which are adapted to interact with the contacts on the rear side of the terminal module.

Even though it can be advantageous, owing to the standardization of specific components, to construct a terminal module with an integrated splitter from two isolating modules, it can also be required that the amount of rows of contacts be kept as low as possible. The overall height of the terminal module, for example, can be advantageously reduced in this way. At the same time, the contacts, as specified in more detail below, can, according to a preferred embodiment, be designed so that they are largely identical to established contacts of telecommunications modules with regard to their geometry and the remainder of their shape. Thus, no expensive adaptations to the contacts of the terminal module are necessary. As mentioned above, the contacts are connected inside the module with appropriate contacts of the splitter groups. This connection can be advantageously accomplished in a particularly easy and direct manner without requiring a "backplane" or another special connecting device.

Finally, the contacts of the terminal module are designed in such a way that they approach each other inside the module, at least in sections, but are, however, separated from one another electrically. Therefore, at least one of the contacts can have at least one section configured so that it approaches a section of the other contact. According to a first alternative of the terminal module, this design basically corresponds to that of isolating contacts in common communications isolating modules. The strip-like contacts herein are designed in such a way that one end, to which cable cores can be connected, is uncovered to the outside, with these uncovered ends of two contacts, which form a isolating contact, being spaced apart from each other. It must be noted that these uncovered ends of the contacts can be designed as insulation displacement contacts. Furthermore, in this case, the use of so-called "wire-wrap pins" is basically conceivable so that one of the non-insulated ends can be wound around a cable core so as to create an electrical connection. Of course, all other techniques for connecting cable cores to the contacts of a terminal module are also conceivable. Inside the module, both contacts approach each other and are connected to one another in an electrically conductive manner in a normal condition, generally via spring shackles. This connection can be broken by appropriate disconnector plugs or test plugs. This established design is used for the new terminal module to the extent that the contacts approach one another inside the module basically in the same way as is the case with isolating contacts. The established design of the contacts as well as the established mechanisms and devices can hereby be used to fix and define the position of the contacts. According to a second alternative of the terminal module, said module can, however, have contacts with sections approaching each other that are separated from each other in the normal condition. This could concern, for example, so-called connecting blocks. It is an advantage that established contact designs can be used to integrate a splitter group into a terminal module and to create the required electrical contacts.

In any case, the contacts of the new terminal module are electrically separated from each other and are connected separately with the contacts of the splitter group so that said splitter group is integrated in the signal transmission path between the contact of one side and the contact of the opposite side. If contacts which, with regard to their design, correspond to the isolating contacts of isolating modules are used, separation can thus occur in a particularly easy manner, as explained in more detail below, by inserting a component such as a common disconnector plug between the contacts. It is thus necessary to separate the contacts from one another since said contacts are to be connected to the contacts of the splitter group separately from one another. Signal routing results hereby in a suitable manner by means of the elements of the splitter group in order to separate the signals and to relay the separated signals to the opposite contacts of the terminal module in a suitable manner.

It must be noted that the reduced height of the terminal module can be used to provide supplementary measures. For example, wire routing means, which lead to two different sides, can be provided on one or both sides of the terminal module. This measure is made possible without having to unnecessarily increase the overall height of the terminal module since the height of the terminal area as such, i.e. without the wire routing means, can be lower than was hitherto possible. In this regard, the full disclosure of DE 202 00 746 U1 is hereby incorporated by reference herein.

The contacts of the terminal module can have at least one separation point in addition to separation so as to connect said contacts separately with the contacts of the splitter group. The signal transmission path, which extends from one contact to the other contact via the splitter group, can hereby be separated so that measurements and/or tests can be undertaken. Thus, a useful separation point also advantageously exists if a separation point, configured between both contacts, is used for separate connection with the splitter group. The contacts of the terminal module can be designed so that they are largely strip-like. The design of the contacts is comparatively simple owing to such a strip-like design, if necessary with various simple inflections whose angles of inflection can be arranged parallel to each other in a simple manner, and it is also possible at the same time for said contacts to approach one another whilst being electrically separated from each other during use.

To separate the contacts from each other, provision can be made, on the one hand, for the contacts, with regard to their geometric design, to be configured such that without the use of additional measures, they are not in contact with each other and are thus electrically separated from each other. Furthermore, the contacts can be provided in such a way that they contact each other in an output condition, to a certain extent like the isolating contacts of an isolating module, and are separated from each other by a separating element during use. Such a separation element can be inserted both from the front side of the module, to which the cable cores can be connected, as well as the inside of the module, and so-to-speak at the rear side of the contacts.

If the separation element is configured so that it can be inserted from above, a common disconnector plug can be advantageously used to separate the contacts.

A particularly simple assembly results if the separation element is provided on the splitter group. The splitter group integrated inside the module is moved towards the front side of the module towards the contacts of the module during assembly in such a way that the contacts of the splitter group are connected with the contacts of the module. In the same assembly movement, one separation element provided on the splitter group can be pushed in between the contacts, which have approached one another, in such a way that separation results. It must hereby be mentioned that the splitter group, which generally includes a printed circuit board, can conveniently be provided with imprinted strip conductors so that the separation of the contacts of the terminal module from each other and the contacting of the same results in the same area. The contacts are separated from each other by inserting the printed circuit board and are subsequently conveniently connected with strip conductors on the printed circuit board in an electrically conductive manner. In this regard, it must be noted that the splitter group do not necessarily have to have a printed circuit board, and that the electronic components of the splitter group do not necessarily have to be arranged on a printed circuit board. Inasmuch, the term "splitter group" is understood in such a way that it relates to any configured appropriate combination of components. However, forked contacts, which are connected with the contacts of the module, can also be used as splitter groups. Such forked contacts can be largely designed as a V-shape, with the legs of the V having protrusions along their extension or at their front end so as to make contact with a contact of the module inserted therein like a pair of tongs. The contact is thus surrounded and contacted on both sides by the forked contact. It must be mentioned at this point that the described measures relate to a feature which also reveals its advantages regardless of all the features of a terminal module described above. In other words, it is considered to be an independent innovation to contact the contacts of a terminal module by means of forked contacts which are usually connected to a printed circuit board. Combining the contacts of the terminal module, which generally have an insulation displacement contact zone on their uncovered area on the outside of the module, with forked contacts, which contact the contacts in their rear area, leads to an electrical contact which is just as easy and reliable.

Finally, the terminal module can have an earthing (grounding) component, preferably a earth plate, which is connected to individual contacts of the terminal module. It must hereby be noted that the terminal module is generally used to transfer high-bit-rate signals, and thus the concerned cables, shieldings and supplementary wires all have so-called "drain wires". Said supplementary wires must be earthed, in order to divert the energy induced during signal transfer. The contacts of the terminal module available anyway can be used for this purpose. In order to eventually divert the energy to earth, which is transferred from the supplementary wire connected to the respective contact, the terminal module can have an earthing component which is connected in an electrically conductive manner to the contacts on which the additional wires are connected. Diversion to earth finally results by means of an electrical connection of the earthing component with a carrier or the like. With regard to the earthing component, the full content of PCT/EP 01/15282 is additionally incorporated by reference herein.

There are other applications in addition to splitter configurations, where it is also necessary to permanently separate the incoming and outgoing line and to arrange any kind of component in between. These are generally electronic components of some kind such as specific configurations for protection against excess current and/or excess voltage, or arrangements for the remote testing of the lines. These devices typically contain electronic parts, but in some cases also relays, which for example allow electrical separation of the incoming and outgoing lines remotely. Thus, in another embodiment, other electrical or electronic components may be arranged in a manner that also requires the separation of the contacts. Accordingly, references to a "splitter group" herein can in suitable instances be understood to include a reference to a corresponding electrical or electronic component such as overcurrent and/or overvoltage protectors, test and measurement devices, and the like.

BRIEF DESCRIPTION OF THE DRAWINGS

The invention is explained in more detail below by means of the embodiments represented in the drawing.

FIG. 1 is a first sectional view through the terminal module;

FIG. 2 is a second sectional view through the terminal module;

FIG. 3 is a sectional view through a further embodiment of the terminal module;

FIG. 4 is a sectional view through yet another embodiment of the terminal module;

DETAILED DESCRIPTION OF THE PREFERRED EMBODIMENTS OF THE INVENTION

Figure 5:
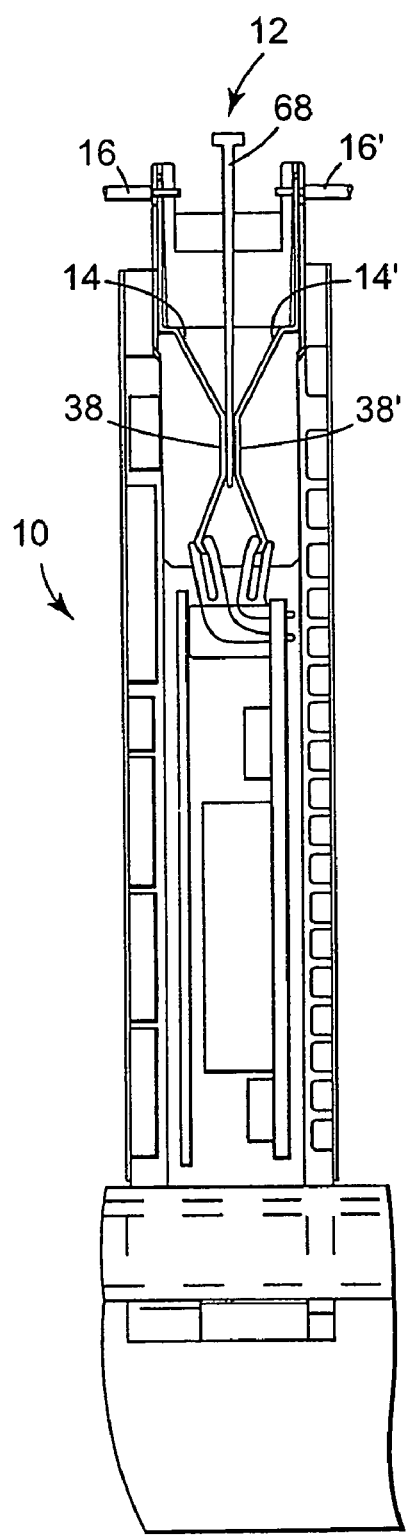
FIG. 5 is a sectional view through the terminal module of FIGS. 1 and 2 having a disconnector plug inserted from the front side.

A section through the terminal module 10 is represented in FIG. 1. On the front side 12 thereof, contacts 14, 14' of the terminal module are uncovered to the outside in such a way that cable cores 16, 16' can be connected thereto. This connection can occur by means of the insulation displacement contact method of termination, during which a contact slot is formed at the end of the respective contact 14, 14', into which a cable core, consisting of a wire core and an insulating sheath, is inserted, with the sharp edges of the contact slot cutting through the sheath and contacting with the wire core. The terminal module shown in FIG. 1 has a certain extension in a direction which is perpendicular to the drawing plane, so that overall there is a largely block-shaped design. Further contacts of the same type are provided on the terminal module in front of and behind the contacts 14, 14' which can be seen in FIG. 1, so that there a two rows of contacts 18, 18'. Wire routing components 20 are provided on the side faces of the terminal module 10, which have wire routing means, in particular wire routing channels 22. By way of these means, the cable cores 16, 16' connected to the front side 12 are routed from the front side of the module 10, on which the wire routing channels begin, either in the direction of the person looking at the drawing, or away from this person to the narrower side faces of the module.

Module 10 is overall conveniently connected to an appropriate carrier 24, for example by latch mounting. There is a splitter group 26 inside the module, which, in the case illustrated, has a printed circuit board 28 on which electronic components 30 are mounted. The electrical connection between the electronic components 30, which are required to split up the transferred signals, and the contacts 14, 14', to which the cable cores 16, 16' are connected, results, on the one hand, via strip conductors which are imprinted on the printed circuit board 28. Conversely, the splitter group 26 has cable contacts 32 which cannot be fully seen in FIG. 1 owing to the sectional drawing. The cable contacts 32 are, however, basically U-shaped with two legs 34. In the case illustrated, one of the two legs has a protrusion 36 at its front end so that the distance between both legs 34 is slightly reduced, at least in this area. The clamping of the rear or inner end of the respective contact 14, 14' occurs in this zone. Regarding contacts 14, 14', it must be said that they are conveniently stamped from sheet metal and extend at least a few millimeters perpendicularly to the drawing plane so that overall there is a strip-like design with appropriate inflexions as seen from the direction of the cable cores 16, 16'. Both upper surfaces of the strip-like design of the contacts 14, 14' are surrounded by the forked contacts 32 and are contacted in an electrically conductive manner. Contacts 14, 14' have a simple design since this design corresponds to a common design of isolating contacts. In the illustrated embodiment, the contacts have insulation displacement contacts at their front end areas, which are basically defined by two contact legs lying one over the other, which are separated from each other by a slot. By inserting an insulated cable core into the slot, insulation is penetrated and the metal area inside the cable core is contacted. The contacts can alternatively be configured as "wire-wrap pins" at these end areas. In these areas, the contacts are clearly spaced apart from one another. Inside the modules, however, the contacts have sections which come closer to each other than those areas of the contacts which the cable cores are connected to. Generally speaking, the contacts approach one another inside the module. The almost become contiguous thereby along two areas 38, 38' in which the contacts run parallel to one another. It must be noted that common isolating contacts contact each other springingly in this area, whereby the connection can be broken by appropriate measures.

In the new terminal module, this connection is at least during use, permanently separated so that the signal can be routed from one contact via the attached forked contact 32 to the splitter group and from there again via the attached forked contact 32' to the opposite contact without a short circuit occurring at the same time in area 38, 38'.

A terminal module 10 is illustrated in FIG. 1, in which the contacts 14, 14' are, with regard to their geometry and design, conveniently configured in such a way that said contacts 14, 14' are separated from one another. It must be noted that contacts 14, 14' can also be designed in such a way that they come into contact, for example, at areas 38, 38' in an output condition. During use, a separating element is inserted between both contacts 14, 14' in these areas 38, 38' so that, as a result, they are electrically separated from one another. This separating element can be provided on splitter group 26 so that in one step, the terminal module can be provided with the splitter group and the separation of the contacts 14, 14' and the connection of the same with the contacts 32, 32' of the splitter group occurs at the same time. Such a separating of the contacts from inside the module furthermore offers the advantage over attaching a separating element on the front side 12 in that the separating element cannot be pulled out unintentionally.

Regarding the ends of the contacts 14, 14' inside the module 10, which are to be clamped by the forked contacts 32, 32', it must be said that they are designed in such a way by means of the recognizable inflection that they can interact particularly reliably with a forked contact 32, 32' to form an electro-conductive connection. For example, the inflection of contact 14' recognized on the right and configured towards the left is responsible for the formation of a peak or a protrusion in this area which can be particularly well contacted by means of the right leg of the forked contact 32'.

In the sectional representation of FIG. 1, a section of an earthing (grounding) component 40 can additionally be seen, the function of which becomes clearer from the sectional representation of FIG. 2. During use, an insulated cable 42 is attached to the carrier 24. An external shielding 44 of the cable is fixed to the carrier 24 by an appropriate measure, e.g. a bracket or clamp 46, and is thereby earthed. The so-called "drain cable" 48, in which a voltage is induced owing to the signal transmission, is routed to the front side 12 of the terminal module and is connected to a specific contact 14. In order to divert the energy directed to the specific contact 14 to earth in this way, the terminal module 10 has the earthing component 40 which can be configured as an earthing plate. On the end facing the front side 12 of the module 10, the earthing plate 40 has appropriate fingers 50 which are connected in an electrically conductive manner to those contacts 14, 14' which the "drain cables" are connected to. It must be noted that the earthing plate 40 can be provided on the splitter groups 26 so that both the earthing plate 40, with the contacts 14, 14' required therefor, and the contacts 32, with the respective contacts 14, 14' of the terminal module 10, can be connected in a single insertion step.

Furthermore, reference is made to German patent DE-U 201 04 605 as well as PCT/EP 01/15283 regarding the details of the construction of such a terminal block with integrated splitter groups, the full disclosure of which is hereby incorporated by reference herein.

In FIG. 3 an embodiment of a terminal module 10 is shown, in which contacts 14, 14' of a so-called connecting block are used. In the uncovered front area, contacts 14, 14' again have insulation displacement contact areas to which cable cores can be connected. In the illustrated embodiment, both contacts approach one another in their front areas owing to the respective configuration of bulges 52, 52'. The strip-like areas of the contacts 14, 14', which extend perpendicularly to the drawing plane, are connected at a section 54, which extends largely parallel to the drawing plane. Again at a bending of 90°, two spring shackles 56 are configured at this section 54, which approach one another but are, however, electrically separated from each other. This is true in the same way for the area in front of both spring shackles 56, 56' where a partition 58 is provided. The partition 58 area and the area between the spring shackles 56, 56' is, however, accessible from the front side 12, so that an appropriate plug or the like can be inserted here so that tests, measurements or connecting work can be carried out. The advantage that an established design of the contacts 14, 14' can be maintained and that a splitter group 26 can be integrated at the same time is also valid for this embodiment of the terminal module. The splitter group has forked contacts 32 and 32', which are connected to the rear sections of the contacts 14, 14' in an electrically conductive manner, in a similar way to the embodiment in FIGS. 1 and 2 in that they surround them. The signal is thus routed from contact 14 of one side over the forked contact 32 via the components of the splitter groups 26, "split up" there and then the split signal is routed via the forked contact 32' to the contact 14' of the opposite side. This mode of operation is also valid for the embodiment in FIG. 4. In this embodiment, the terminal module 10 has the splitter group 26, however, no forked contact, but rather contact 60 which is conveniently connected with spring shackles. For the separate connection with contacts 14, 14' of the terminal module, contact 14 is routed from the one side to an area which is comparatively wide at the rear side of the terminal module 10 and is provided here with a section which interacts with the spring shackles of the contact 60. Contact 14' of the opposite side approaches contact 14 starting from its front end area, and has a spring shackle 62 in this area which interacts with a special contact 64 to form a disconnectable separation point 66. In the normal condition, the spring shackle 62 thus abuts contact 64 and creates and electro-conductive connection. Owing to the interaction the spring shackle of the front contact 60' of the splitter group, contact 14' is connected with contact 14 via the splitter group. Owing to the fact that the contact 14' does, however, have the separation point 66, a test, measurement or switch plug can be inserted here to carry out required actions if necessary.

In FIG. 5 it is additionally shown, as in an embodiment of the terminal module which corresponds to FIGS. 1 and 2, that the separation of the contacts 14 and 14', so that they can be connected separately with the splitter group, can be configured. For this purpose, a disconnector plug 68 is inserted from the front side 12. Both contacts 14, 14' are hereby safely spaced apart from one another and electrically separated from one another, also in areas 38, 38' where they are comparatively close to one another. The transferred signal is hereby routed from the cable core 16 of one side via the splitter group, and from there is routed to the cable core 16' of the other side without causing a short circuit between the cable cores 16, 16' and the contacts 14, 14'.

Figure 6:
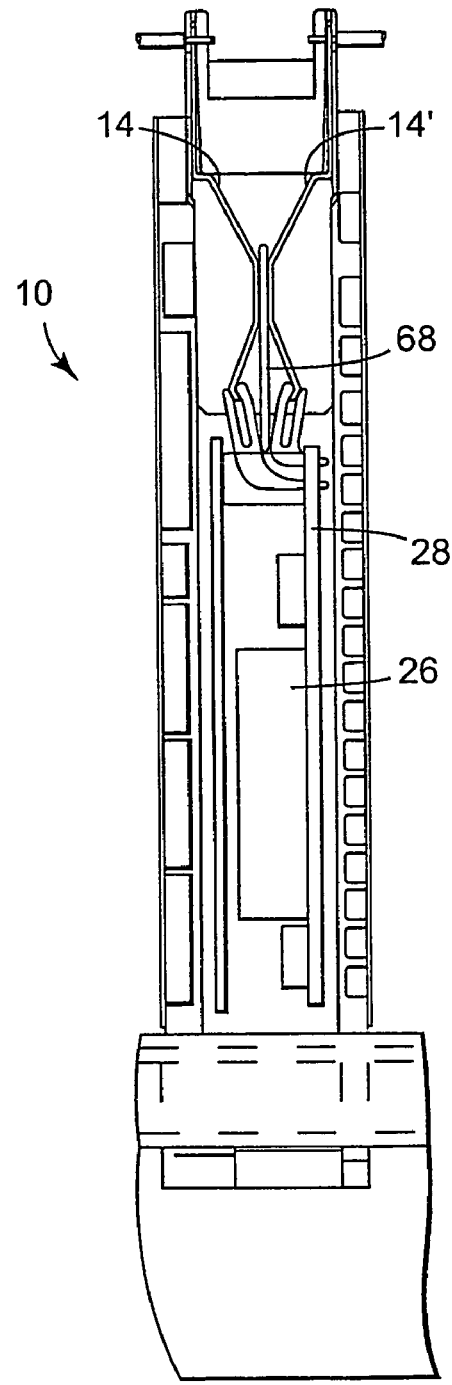
FIG. 6 is a sectional view through the terminal module of FIGS. 1 and 2 having a disconnector plug inserted from the rear side.

This can also be achieved by the embodiment in FIG. 6. In this case, the disconnector plug 68 is inserted from the rear side, i.e. the side with the splitter group 26. This also leads to the contacts 14, 14' being spaced apart as required. This embodiment of FIG. 6 offers the advantage over the embodiment in FIG. 5 that the disconnector plug 68 is not easily accessible and thus, there is a lower probability of said disconnector plug 68 being unintentionally detached. The disconnector plug 68 can hereby be tightly connected to the splitter group 26, in particular the printed circuit board 28 thereof, so that whenever the splitter group 26 is applied from the rear side of the module, it is guaranteed that the contacts 14, 14' will be separated.

We claim:

1. A telecommunications terminal module having:
   (a) an electrical or electronic component integrated in the terminal module, and
   (b) two rows of contacts to which cable cores can be connected from outside the terminal module, the contacts being connected with contacts of the component inside the terminal module, and the two rows of contacts being designed in such a way that they approach each other inside the terminal module, at least in parts, but are electrically separated from one another and each are separately connected to the component.

2. The terminal module according to claim 1, wherein the component is a splitter group.

3. The terminal module according to claim 1, wherein the component provides protection against excess voltage, current, or both.

4. A terminal module according to claim 1, wherein at least one of the contacts to which cable cores can be connected from outside the terminal module has a separation point.

5. A terminal module according to claim 1, wherein the contacts to which cable cores can be connected from outside the terminal module are strips.

6. A terminal module according to claim 1, wherein the electrical or electronic component has forked contacts which are connected to the contacts of the terminal module to which cable cores can be connected from outside the terminal module.

7. The terminal module according to claim 1, wherein the component provides testing and measurement of a line.

8. The terminal module according to claim 7, wherein the component comprises a relay.

9. A terminal module according to claim 1, wherein the contacts to which cable cores can be connected from outside the terminal module abut one another in an output condition and are separated from each other by a separating element during use.

10. A terminal module according to claim 9, wherein the separating element can be inserted from the front side of the terminal module.

11. A terminal module according to claim 9, wherein the separating element is provided on the electrical or electronic component.

12. A terminal module according to claim 1, wherein the terminal module further comprises an earthing component.

13. A terminal module according to claim 12, wherein the earthing component is an earthing plate.

* * * * *

UNITED STATES PATENT AND TRADEMARK OFFICE
CERTIFICATE OF CORRECTION

| | | |
|---|---|---|
| PATENT NO. | : 7,140,926 B2 | Page 1 of 1 |
| APPLICATION NO. | : 10/504935 | |
| DATED | : November 28, 2006 | |
| INVENTOR(S) | : Christine B. Bund | |

It is certified that error appears in the above-identified patent and that said Letters Patent is hereby corrected as shown below:

Title Page

Page 2, Column 2, (Foreign Patent Documents)
Line 6, before "0243 296 A1" delete "WO" and insert -- EP --, therefor.

Signed and Sealed this

Sixth Day of March, 2007

JON W. DUDAS
*Director of the United States Patent and Trademark Office*